United States Patent
Petignaud et al.

(10) Patent No.: US 12,210,223 B2
(45) Date of Patent: Jan. 28, 2025

(54) METHODS AND SYSTEMS FOR OPTIMIZING AN OPTICAL FUNCTION OF A PROGRESSIVE OPHTHALMIC LENS UNDER SPECIFIC WEARING CONDITIONS

(71) Applicant: ESSILOR INTERNATIONAL, Charenton-le-pont (FR)

(72) Inventors: Cécile Petignaud, Charenton-le-Pont (FR); Marie-Gaelle Froeliger, Charenton-le-Pont (FR); Nacer Lakhchaf, Charenton-le-Pont (FR); Bénédicte Deldalle, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 707 days.

(21) Appl. No.: 17/439,941

(22) PCT Filed: Apr. 13, 2020

(86) PCT No.: PCT/EP2020/060363
§ 371 (c)(1),
(2) Date: Sep. 16, 2021

(87) PCT Pub. No.: WO2020/208251
PCT Pub. Date: Oct. 15, 2020

(65) Prior Publication Data
US 2022/0179238 A1    Jun. 9, 2022

(30) Foreign Application Priority Data
Apr. 11, 2019    (EP) ..................... 19305469

(51) Int. Cl.
G02C 7/02    (2006.01)
G02C 7/06    (2006.01)

(52) U.S. Cl.
CPC ............. G02C 7/027 (2013.01); G02C 7/028 (2013.01); G02C 7/061 (2013.01)

(58) Field of Classification Search
CPC ......... G02C 7/027; G02C 7/028; G02C 7/061
(Continued)

(56) References Cited

U.S. PATENT DOCUMENTS

2004/0032565 A1    2/2004 Yamakaji et al.
2007/0242218 A1*   10/2007 Berthezene ............ G02C 7/027
                                                   351/159.42

(Continued)

FOREIGN PATENT DOCUMENTS

CN    1340166 A     3/2002
CN    107209399 A   9/2017
(Continued)

OTHER PUBLICATIONS

International Search Report for PCT/EP2020/060363 mailed Oct. 6, 2020, 4 pages.
(Continued)

Primary Examiner — James R Greece
(74) Attorney, Agent, or Firm — NIXON & VANDERHYE

(57) ABSTRACT

Disclosed is a method for determining an optical function of a progressive ophthalmic lens for a wearer, including: providing a prescription of the wearer; providing wearing data including at least a numerical parameter; providing by at least one processor a set of predefined optical functions including at least a first predefined optical function adapted to the prescription of the wearer and to a first predefined wearing parameter and a second predefined optical function for the prescription of the wearer and to at least a second predefined wearing data parameter, the second predefined optical function being different from the first; and determin-
(Continued)

ing an optical function of the progressive ophthalmic lens, so: when the wearing data parameter≥a threshold value, the optical function of the lens=first predefined optical function, and when the wearing data parameter<the threshold value, the optical function=the second predefined optical function.

18 Claims, 4 Drawing Sheets

(58) Field of Classification Search
 USPC .................................................. 351/159.74
 See application file for complete search history.

(56) References Cited

U.S. PATENT DOCUMENTS

2012/0008090 A1 1/2012 Atheimer et al.
2015/0309338 A1* 10/2015 Chauveau .............. G02C 7/027
 351/204
2017/0299890 A1* 10/2017 Hernandez-Castaneda ................
 G02C 7/028

FOREIGN PATENT DOCUMENTS

DE 10 2004 059 448 A1 6/2006
DE 10 2008 057 206 A1 5/2010
EP 1 154 302 11/2001
EP 3 109 693 12/2016

OTHER PUBLICATIONS

Written Opinion of the ISA for PCT/EP2020/060363 mailed Oct. 6, 2020, 6 pages.
Office Action issued in Chinese Patent Application No. 202080020145.1 dated Feb. 7, 2023.

* cited by examiner

METHODS AND SYSTEMS FOR OPTIMIZING AN OPTICAL FUNCTION OF A PROGRESSIVE OPHTHALMIC LENS UNDER SPECIFIC WEARING CONDITIONS

This application is the U.S. national phase of International Application No. PCT/EP2020/060363 filed Apr. 13, 2020 which designated the U.S. and claims priority to EP patent application Ser. No. 19/305,469.9 filed Apr. 11, 2019, the entire contents of each of which are hereby incorporated by reference.

FIELD OF THE INVENTION

The invention relates to methods and systems for optimizing an optical function of a progressive ophthalmic lens under specific wearing conditions, to methods and systems for manufacturing a progressive ophthalmic lens adapted to a wearer, to progressive ophthalmic lenses, and to computer program products, computer-readable storage mediums and devices for running said methods.

BACKGROUND OF THE INVENTION

Usually, a person wishing to have an optical equipment goes to see an eye care practitioner.

The usual methods for determining the dioptric parameters of an ophthalmic lens to be provided to a person aim at compensating a defect of an eye of the person in standard wearing conditions, corresponding to a distance between the eye rotation center and the lens equal to 25.5 mm.

However, the optical requirements may be different from a person to another, depending on the wearing conditions, which may also be affected by specific viewing conditions and/or by specific types of activity.

Therefore, there is a need for methods and systems that would allow determining a personalized optical function of an ophthalmic lens according to the wearing conditions.

One object of the present invention is to provide such methods and systems.

SUMMARY OF THE INVENTION

To this end, the invention proposes a method for determining an optical function of a progressive ophthalmic lens adapted to a wearer, wherein the method comprises:
   providing a prescription of the wearer,
   providing wearing data related to specific wearing conditions, the wearing data comprising at least a wearing data parameter having a numerical value,
   providing by at least one processor a set of predefined optical functions comprising at least
      a first predefined optical function adapted to the prescription of the wearer and to a first predefined value of a wearing data parameter and
      a second predefined optical function adapted to the prescription of the wearer and to at least a second predefined value of a wearing data parameter, the second predefined optical function being different from the first predefined optical function, and
   determining an optical function of the progressive ophthalmic lens, such that:
      when the wearing data parameter has a numerical value greater or equal to, a threshold value, the optical function of the progressive lens is equal to the first predefined optical function, and
      when the wearing data parameter has a numerical value smaller said threshold value, the optical function of the progressive lens is equal to the second predefined optical function.

Advantageously, thanks to determining an optical function of the progressive ophthalmic lens equal to the first or to the second optical functions depending on the numerical value of the wearing data parameter, the optical function of the progressive ophthalmic lens is adapted to the wearing conditions.

According to embodiments, the method according to the invention may further comprise one or several of the following features according to any possible combination:
   the wearing data parameter comprises a wearing distance corresponding to a distance between a part of the eye of the wearer and an optical lens under the specific wearing conditions; and/or
   when the wearing distance has a numerical value greater or equal to, a threshold value, the optical function of the progressive lens is equal to the first predefined optical function; and/or
   when the wearing distance has a numerical value smaller than said threshold value, the optical function of the progressive lens is equal to the second predefined optical function; and/or
   the progressive ophthalmic lens comprises a fitting cross, a far vision zone with an optical power corresponding to a far distance power, a near vision zone with an optical power corresponding to a near distance power and a progression zone with a gradient of optical power extending from the far vision zone to the near vision zone, the near vision zone extending from a first lowering gaze angle to a second lowering gaze angle with respect to the fitting cross; and/or
   the first predefined optical function and the second predefined optical function each correspond to values for the first lowering gaze angle, the second lowering gaze angle, the optical power in the far vision zone, and the optical power in the near vision zone; and/or
   the second predefined optical function differs from the first predefined optical function at least in one of the values for the first lowering gaze angle, the second lowering gaze angle, the optical power in the far vision zone, and the optical power in the near vision zone; and/or
   during predefining the optical function, the optical power in the near vision zone is set to a predefined value; and/or
   during determining the predefined optical function, the optical power in the near vision zone is set to the predefined value if the wearing distance is above, or equal to, the specific threshold value; and the optical power in the near vision zone is set to an optimized value smaller than the predefined value if the wearing distance is below a specific threshold value; and/or
   the optical power in the near vision zone is set to an optimized value smaller than the predefined value if the wearing distance is below a threshold value, and if the predefined value of the optical power is positive, the optimized value is less positive than the predefined value, and if the predefined value of the optical power is negative, the optimized value is more negative than the predefined value; and/or
   the zone of interest comprises a fitting cross and a near vision zone extending from a first lowering gaze angle to a second lowering gaze angle with respect to the fitting cross; and/or the far vision zone extends to a third lowering gaze angle, during predefining the optical function, the position of the progression zone is predefined based on the prescription of the wearer and wearing data related to wearing conditions, so that the progression zone extends from a predefined value of a fourth lowering gaze angle, said predefined value being greater than the third lowering gaze angle; and during determining the optical function, the position of the progression zone is optimized based on the predefined optical function and the wearing distance so that the progression zone extends from the predetermined value of the fourth lowering gaze angle if the wearing distance is above, or equal to, a specific threshold value, and at an optimized value greater than the predetermined value of the fourth lowering gaze angle if the wearing distance is below the specific threshold value.

the zone of optical interest comprises an additional zone extending from the near vision zone towards a lowering gaze angle greater than the second lowering gaze angle; and/or during determining the optical function, the optical power is stabilized in the additional zone at a value substantially equal to the optical power in the near distance zone if the wearing distance is below the specific threshold value; and/or during determining the optical function, the optical function of the progressive ophthalmic lens is optimized based on the predefined optical function and the wearing distance; and/or during determining the optical function, the predefined optical function of the progressive ophthalmic lens is optimized in the near vision zone based on a comparison between a wearing data and a specific threshold value; and/or the specific threshold value is equal to a standard value of wearing data; and/or the wearing distance is the distance between the eye rotation center and the lens under specific wearing conditions; and/or determining a wearing data, during which wearing data of the wearer are determined under the specific wearing conditions; and/or during providing the wearing data, the determined wearing data are provided;

during providing the wearing data, standard values of the wearing data are provided; and/or during determining the optical function, the optical function of the progressive ophthalmic lens is optimized based on a linear function of the wearing distance; and/or the wearing distance is lower than, or equal to, 25.5 mm, preferably greater than, or equal to, 20 mm; and/or during determining the optical function, the optical function of the progressive ophthalmic lens is determined and personalized according to the wearing conditions.

In a further aspect, the invention relates to a method for manufacturing a progressive ophthalmic lens adapted to a wearer, comprising:

providing an optical lens, during which an optical lens is provided, determining an optical function, during which an optical function is determined according to the method of the invention, and manufacturing a progressive ophthalmic lens, during which a progressive ophthalmic lens is manufactured from the optical lens based on the determined optical function.

In a further aspect, the invention relates to a progressive ophthalmic lens manufactured according to the method of the invention.

In a further aspect, the invention relates to a computer program product comprising one or more stored sequences of instructions that are accessible to a processor and which, when executed by the processor, causes the processor to carry out a method according to the invention.

In a further aspect, the invention relates to a computer-readable storage medium having a program recorded thereon; where the program makes the computer execute at least a method according to the invention.

In a further aspect, the invention relates to a system for the execution of a method according to the invention, the system comprising a processor, and a memory adapted to store one or more sequences of instructions that are accessible to the processor and which, when executed by the processor, causes the processor to carry out the steps of the method and to carry out at least the step of determining the predefined optical function of the progressive ophthalmic lens.

In a further aspect, the invention relates to a system for the execution of a method according to the invention, the system comprising:

a memory for storing an optical function of a progressive ophthalmic lens, the optical function being predefined based on a prescription of a wearer and on wearing data related to specific wearing conditions, the wearing data comprising at least a wearing distance corresponding to a distance between a part of the eye of the wearer and an optical lens under the specific wearing conditions; and a processor determining the optical function of the progressive ophthalmic lens in a zone of optical interest based on specific threshold value for the wearing data, the processor being linked with the memory via a data connection.

BRIEF DESCRIPTION OF THE DRAWINGS

Non limiting embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Throughout the detailed description of the drawings below, the method according to the invention may refer to "providing", "determining", "manufacturing", "optimizing" and "predefining", and the like, or alternately to equivalent "steps" of a method, that is, "a providing step", "a determining step", "a manufacturing step", "an optimizing step" and "a predefining step", and the like.

DETAILED DESCRIPTION OF THE DISCLOSURE

The invention relates to a method for determining an optical function of a progressive ophthalmic lens adapted to a wearer.

Figure 1:
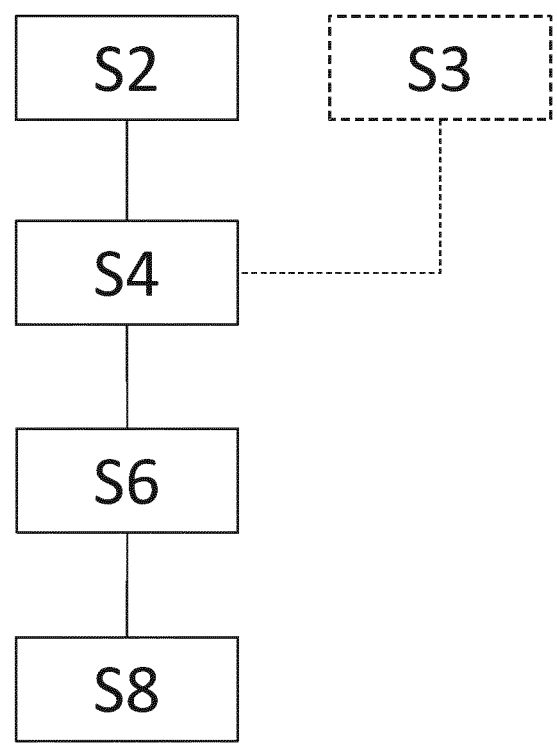
FIG. 1 is a schematic diagram of the steps of a method for determining an optical function according to the invention.

As illustrated on FIG. 1, the method according to the invention comprises at least:
- a prescription providing step S2,
- a wearing data providing step S4,
- an optical function predefining step S6, and
- an optical function determining step S8.

Figure 2:
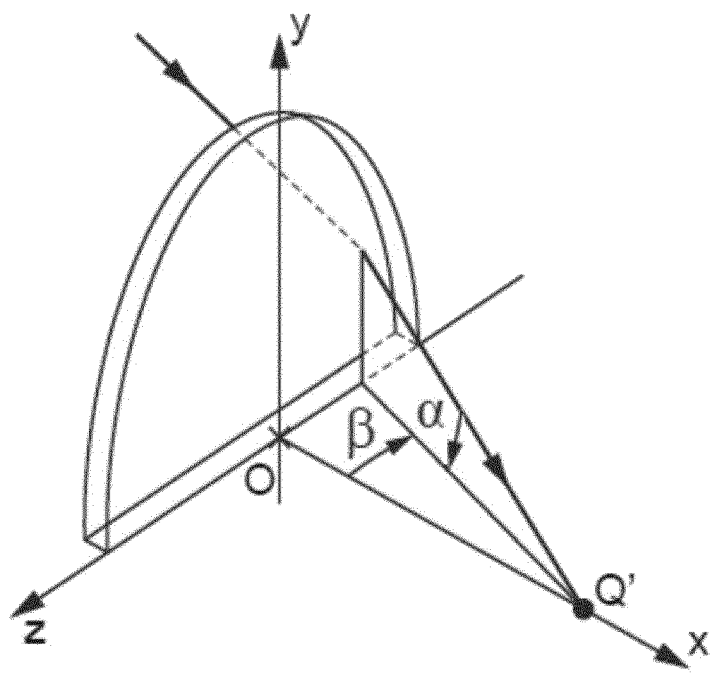
FIGS. 2 and 3 are diagrammatic illustrations of optical systems of eye and lens.
Figure 3:
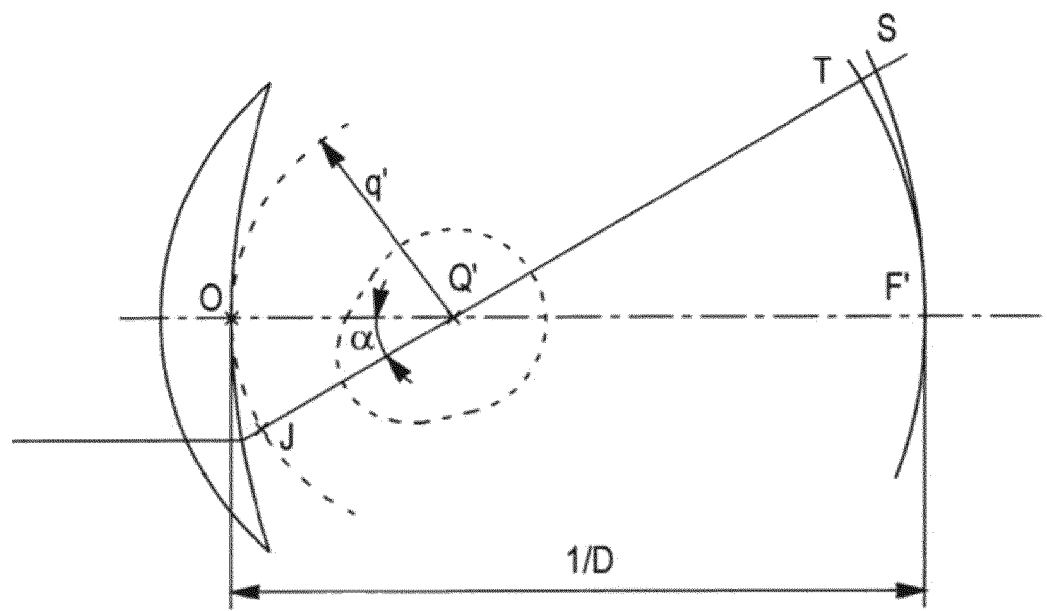

FIGS. 2 and 3 are diagrammatic illustrations of optical systems of eye and lens, thus showing the definitions used in the description. More precisely, FIG. 2 represents a perspective view of such a system illustrating parameters $\alpha$ and $\beta$ used to define a gaze direction. FIG. 3 is a view in the vertical plane parallel to the antero-posterior axis of the wearer's head and passing through the center of rotation of the eye in the case when the parameter $\beta$ is equal to 0.

The center of rotation of the eye is labeled Q'. The axis Q'F', shown on FIG. 3 in a dot-dash line, is the horizontal axis passing through the center of rotation of the eye and extending in front of the wearer—that is the axis Q'F' corresponding to the primary gaze view. This axis cuts the surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. A value of radius q' of 25.5 mm corresponds to a standard value.

A given gaze direction—represented by a solid line on FIG. 3—corresponds to a position of the eye in rotation around Q' and to a point J of the apex sphere; the angle $\beta$ is the angle formed between the axis Q'F' and the projection of the straight line Q'J on the horizontal plane comprising the axis Q'F'. The angle $\alpha$ is the angle formed between the axis Q'F' and the projection of the straight line Q'J on the vertical plane comprising the axis Q'F'; this angle appears on the scheme on FIG. 2. A given gaze view thus corresponds to a point J of the apex sphere or to a couple ($\alpha$, $\beta$). The more the value of the lowering gaze angle is positive, the more the gaze is lowering and the more the value is negative, the more the gaze is rising.

The progressive ophthalmic lens may be a semi-finished lens blank, a finished uncut lens, or a finished lens edged to the proper shape and edge contour to fit into a frame.

A principal progression meridian may cross the progressive ophthalmic lens. The meridian has a power progression which may correspond approximately to the value of a prescribed addition.

Figure 4:
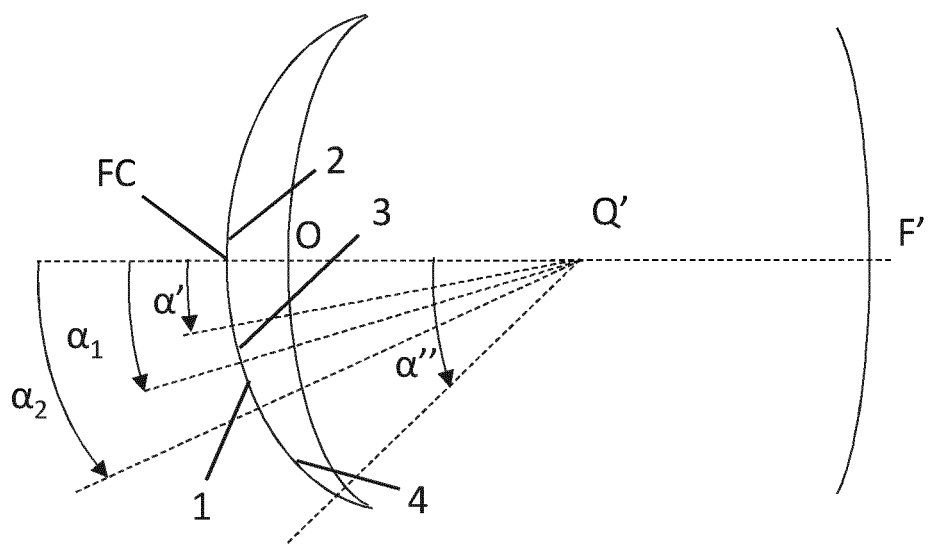
FIG. 4 is a diagrammatic illustration of a progressive ophthalmic lens according to the invention.

A fitting cross FC is marked by a reference point on the surface of the optical lens and constitutes an aid for fitting the cut-out lens into the frame; this fitting cross FC makes it possible to locate on the lens the primary direction of viewing under wearing conditions. In this context, progression length refers to the vertical distance between the fitting cross FC and a point of the meridian in near-vision at which the power progression reaches an optical power corresponding to a prescribed near distance optical power. The progression length defines the accessibility to the necessary near-vision powers. In fact, the meridian profile represents the wearer power as a function of lowering the eyes in the eye sockets with a direction of viewing which is straight ahead. Thus, according to the value of the progression length, the wearer will have to lower his eyes more or less in order to be able to take full advantage of the near-vision zone. As illustrated on FIG. 4, the progressive ophthalmic lens comprises a near vision zone 1, a far vision zone 2 and a progression zone 3. The progressive ophthalmic lens may further comprise an additional zone 4.

The near vision zone 1 is a zone of the lens as defined in ISO 13666:2012 within which the local optical characteristics of optical power and of astigmatism of the lens have substantially uniform values corresponding to near vision. The near vision zone 1 extends vertically from a first lowering gaze angle $\alpha 1$ to a second lowering gaze angle $\alpha 2$ with respect to the fitting cross FC.

In embodiments, the first lowering gaze angle $\alpha 1$ may be greater than, or equal to, 15 degrees, the second lowering gaze angle $\alpha 2$ may be smaller than, or equal to, 45 degrees, and the difference $\alpha 2 - \alpha 1$ between the second lowering gaze angle and the first lowering gaze angle may be smaller, or equal to, a predetermined value determined consistently with specifications of progressive ophthalmic lenses, such as the positioning tolerance on the near vision control zone, as defined in standard ISO 21987:2017. In embodiments, said predetermined value is smaller than, or equal to, 8 degrees.

The far vision zone 2 is a zone of the lens as defined in ISO 13666:2012 within which the local optical characteristics of optical power and of astigmatism of the lens have substantially uniform values corresponding to far vision. The far vision zone 2 extends vertically up to a third lowering gaze angle (not represented on the figures) which is close to 0.

The progression zone 3 is a zone of the lens as defined in ISO 13666:2012 covering the transition between the far vision zone 2 and the near vision zone 1 of the progressive ophthalmic lens. The progression zone 3 exhibits a gradient of optical power. The progression zone extends vertically from the start of optical power progression at a fourth lowering gaze angle $\alpha'$ greater than, or equal to, the third lowering gaze angle to the end of optical power progression at a fifth lowering gaze angle (not represented on the figures) smaller than, or equal to, the first lowering gaze angle $\alpha 1$.

The additional zone 4 is a zone of the lens extending from the near vision zone 1 to a sixth lowering gaze angle $\alpha''$ greater than the second lowering gaze angle $\alpha 2$.

In embodiments, each of the near vision zone 1, the far vision zone 2, the progression zone 3 and the additional zone 4 may extend horizontally along a limited range of angles $\beta$ with respect to the fitting cross FC.

The progressive ophthalmic lens comprises a zone of optical interest comprising the near vision zone 1 and the progression zone 3. In embodiments, the zone of optical interest may further comprise the far vision zone 2. In embodiments, the zone of optical interest may further comprise the additional zone 4. In embodiments, the zone of optical interest may correspond to the full progressive ophthalmic lens, particularly if the progressively ophthalmic lens is edged to fit into a frame. In embodiments, particularly if the progressive ophthalmic lens is uncut, the zone of ophthalmic lens may correspond to the corresponding edged lens obtained by edging the uncut lens.

During the prescription providing step S2, a prescription of the wearer is provided. The prescription of the wearer refers to one or more data obtained for the wearer and indicative for at least an eye, preferably for each eye, of a near distance optical power suitable for correcting presbyopia, either directly or in the form of a prescribed addition ADD.

The prescription of the wearer may further include a prescribed sphere SPH indicative of a far distance optical power and/or a prescribed astigmatism value CYL and a prescribed axis AXIS suitable for correcting the ametropia of each eye of the wearer.

During the wearing data providing step S4, wearing data related to specific wearing conditions is provided. The wearing data comprise at least a wearing data parameter having a numerical value. In embodiments, the wearing data parameter comprises a wearing distance corresponding to a distance between a part of the eye of the wearer and an optical lens under the specific wearing conditions.

Wearing conditions may be defined by at least a position of one of the surfaces of the ophthalmic lens, for example the rear surface of the ophthalmic lens, with respect to a position of part of the eye of the wearer, for example the center of rotation of the eye of the wearer, the pupil of the eye of the wearer, or the cornea apex of the eye of the wearer, when the ophthalmic lens is used by the wearer, after it has been fitted into the frame of a pair of spectacles and placed on the wearer's face.

Wearing data related to wearing conditions may comprise any of the following data: a primary viewing direction, a distance between part of the eye of the wearer and a surface of the ophthalmic lens, a pantoscopic angle and a wrap angle.

The pantoscopic angle may correspond to the angle in the vertical plane between the optical axis of the spectacle lens and the visual axis of the eye in the primary position, usually taken to be the horizontal. Another alternate definition of the pantoscopic angle is provided in ISO 13666:2012.

The wrap angle is the angle in the horizontal plane between the optical axis of the spectacle lens and the visual axis of the eye in the primary position, usually taken to be the horizontal. Another alternate definition of the wrap angle is provided in ISO 13666:2012.

Specific wearing conditions are understood in the sense of the invention as wearing conditions specific to the wearer, as opposed to standard wearing conditions.

In the sense of the invention, specific wearing data related to specific wearing conditions comprise at least one value different from a standard value.

Standard values of wearing data related to standard wearing conditions correspond to a distance between the center of rotation of the eye and the rear face of the ophthalmic lens of 25.5 mm, a distance between the pupil of the eye and the rear face of the ophthalmic lens of 12 mm, a pantoscopic angle of 8 degrees and a wrap angle of 0 degrees.

The method of the invention may further comprise, prior to the wearing data providing step S4, a wearing data determining step S3. During the wearing data determining step S3, wearing data of the wearer are determined under specific wearing conditions. Wearing data may be determined from measurements on the wearer and a spectacle frame chosen by the wearer.

During the optical function predefining step S6, the optical function of the progressive ophthalmic lens is predefined based on the prescription of the wearer and the wearing data.

During the optical function predefining step S6, a set of optical functions may be predefined.

The set of predefined optical functions comprises a first predefined optical function adapted to the prescription of the wearer and to a first predefined value of a wearing data parameter and a second predefined optical function adapted to the prescription of the wearer and to at least a second predefined value of a wearing data parameter, the second predefined optical function being different from the first predefined optical function.

The set of predefined optical functions may comprise additional optical functions adapted to the prescription of the wearer and corresponding to additional predefined values of a wearing data parameter.

In embodiments, the first predefined optical function and the second predefined optical function each correspond to values for the first lowering gaze angle, the second lowering gaze angle, the optical power in the far vision zone, and the optical power in the near vision zone, and the second predefined optical function differs from the first predefined optical function at least in one of the values for the first lowering gaze angle, the second lowering gaze angle, the fourth lowering gaze angle and the optical power in the near vision zone.

In embodiments, during the optical function predefining step S6, the dioptric function of the progressive ophthalmic lens is predefined, or the optical design of the progressive ophthalmic lens is predefined, based on the prescription of the wearer and the wearing data.

The optical function of the progressive ophthalmic lens is predefined or has a predefined value at least in the near vision zone 1, and possibly also in one or more of the following zones: the far vision zone 2, the progression zone 3 and the additional zone 4.

In the sense of the invention, the optical function corresponds to a function providing for each gaze direction the effect of the optical lens on the light ray passing through the optical lens.

The optical function may comprise a dioptric function, or a non-dioptric function such as light absorption, polarizing capability, reinforcement of contrast capacity, etc. . . .

The dioptric function corresponds to the optical lens power (mean power, astigmatism etc. . . . ) as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. A progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. A progressive lens design comprises:
  a power profile along the main gaze directions (meridian line) used by the lens wearer during day life activities,
  distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

During the optical function determining step S8, the predefined optical function of the progressive ophthalmic lens is determined in the zone of optical interest based on at least one threshold value for the specific wearing data.

The method allows determining an optical function of the ophthalmic lens, the optical function being customized according to specific wearing conditions, thanks to the optical function determining step S8.

Advantageously, the optical function of the ophthalmic lens is customized by taking into account such specific wearing conditions.

In order to do so, at least one value of specific wearing data provided during the wearing data providing step S4, such as a wearing distance, may be compared to a predefined threshold value. Then, if the provided value is below the threshold value, the predefined optical function of the progressive ophthalmic lens is optimized according to a first formula, whereas if the provided value is above, or equal to, the threshold value, then the predefined optical function of the progressive ophthalmic lens is optimized according to a second formula different from the first formula.

During the optical function determining step S8, the optical function of the progressive ophthalmic step is determined so that when the wearing data parameter has a numerical value greater than, or equal to, a threshold value, the optical function of the progressive lens is equal to a first predefined optical function adapted to the prescription of the wearer and to a first predefined value of a wearing data parameter, and when the wearing data parameter has a numerical value smaller than said threshold value, the optical function of the progressive lens is equal to a second predefined optical function adapted to the prescription of the wearer and to at least a second predefined value of a wearing data parameter, the second predefined optical function being different from the first predefined optical function.

In embodiments, the optical function of the progressive ophthalmic step may be determined so that when the wearing distance has a numerical value greater than, or equal to, a threshold value, the optical function of the progressive lens is equal to the first predefined optical function, and when the wearing distance has a numerical value smaller than said threshold value, the optical function of the progressive lens is equal to the second predefined optical function.

In embodiments, at least one predefined optical function is optimized.

Such optimization of the predefined optical function of the progressive ophthalmic lens may be performed in one or more of the following zones: the near vision zone 1, the far vision zone 2, the progression zone 3 and the additional zone 4.

The optical function may be optimized in the near vision zone 1 as following:
  if the wearing distance is above, or equal to, a specific threshold value, then the optical power is unchanged, with respect to the predefined value of optical power in the near vision zone 1, or equal to the predefined value at the nearest 0.10 D; whereas
  if the wearing distance is below the specific threshold value, then the optical power in the near vision zone is substantially smaller, that is at least 0.10 D smaller, preferably at least 0.25 D smaller, than the predefined value of optical power in the near vision zone 1. The term smaller is to be understood in the following manner:
    if the predefined value of the optical power is positive, the optimized optical power in near vision zone 1 is less positive than the predefined value of optical power in the near vision zone 1, and
    if the predefined value of the optical power is negative, the optimized optical power in near vision zone 1 is more negative than the predefined value of optical power in the near vision zone 1.

The optical power in the near vision zone 1 is reduced when the eye-lens distance is below the specific threshold independently of the presumed required optical power to focus the perceived the image onto the retina of the wearer's eye.

It has been observed that under-correcting the optical power in near vision enable to reduce the lateral aberrations. The trade-off between the optical power under-correction and the reduction of lateral aberrations enable to provide the wearer with a more comfortable corrected vision.

In embodiments, the threshold value relative to the specific wearing distance is significantly lower than the standard wearing distance: the threshold value is lower or equal to 25.5 mm and greater than, or equal to, 20 mm.

In an embodiment, the value of the lowering gaze angle $\alpha'$ corresponding to the start of optical power progression may be predefined during the optical function predefining step S6 and optimized during the optical function determining step S8 as following:
  if the wearing distance is above, or equal to, a specific threshold value, then the position of the progression zone is optimized so that the progression zone extends from the predetermined value of the lowering gaze angle $\alpha'$, whereas
  if the wearing distance is below the specific threshold value, the position of the progression zone is optimized so that the progression zone extends from an optimized value greater than the predetermined value of the lowering gaze angle $\alpha'$.

In the case where the wearing distance is below the specific threshold value, an optimized value greater than the predetermined value of the lowering gaze angle $\alpha'$ enables to lower to the progression zone 3. Lowering the progression zone when the wearing distance is shorter than the threshold value, while maintaining the beginning of the near vision zone, enables the wearer of the lens to have a reduced progression zone 3 so that the downward rotation of the eye of the wearer is not altered and that the lowering gaze angle to reach the near vision 1 is not too high and uncomfortable for the user.

In the case where the wearing distance is below the specific threshold value, the progression zone is lowered and the optical power in near vision lowered in near vision 1, the reduction of the optical power in the near vision zone 1 enables to have a reduced optical power difference between the far vision and the near vision zones. This reduced optical difference enables to not alter the comfort of the wearer when the progression zone is reduced while lowering the lateral aberrations at the same time.

Therefore, the start of optical power progression is located at a greater value of lowering gaze angle if the wearing distance is shorter than a standard wearing distance.

Advantageously, the start of optical power progression is customized by taking into account the wearing distance.

In an embodiment, during the optical function determining step S8, the optical power is stabilized in the additional zone 4 as following:
  if the wearing distance is above, or equal to, the threshold value, then the optical power is unchanged, with respect to the predefined value of optical power in the near vision zone 1, that is to say the optical power remains equal to the predefined value at the nearest 0.10 D; whereas
  if the wearing distance is below the threshold value, then the optical power is stabilized at a value substantially equal, that is to the nearest 0.10 D, to the optical power in the near distance zone 1.

Therefore, the size of the zone of the ophthalmic lens in which the optical power corresponds to correcting a defect for near vision is increased if the wearing distance is shorter than a standard wearing distance.

Advantageously, the size of the zone of the ophthalmic lens in which a defect is corrected for near vision is customized by taking into account the wearing distance.

In embodiments, the optical function of the progressive ophthalmic lens is optimized during the optical function optimization step S8 based on a linear function of the wearing distance.

Such linear function is applicable for optimizing the value of the optical power in the near vision zone 1 and/or the value of the lowering gaze angle α' corresponding to the start of optical power progression.

For example, the lowering gaze angle α' corresponding to the start of optical power progression, expressed in degrees, may be modified as a function of the wearing distance d, expressed in millimeters, so that:
- if the wearing distance d is 25.5 mm or above, then the optimized value of the lowering gaze angle α' is equal to the predefined value;
- if the wearing distance d is lower than 20 mm, then the optimized value of the lowering gaze angle α' is 2 degrees greater than the predefined value; and
- if the wearing distance d is lower than 25.5 mm and greater than, or equal to, 20 mm, then the difference between the optimized value and the predefined value of the lowering gaze angle α' is calculated according to a linear function of the wearing distance d.

Advantageously, the more the wearing distance is different from a standard wearing distance, the more the optimized optical function is different from the predetermined optical function.

Figure 5:
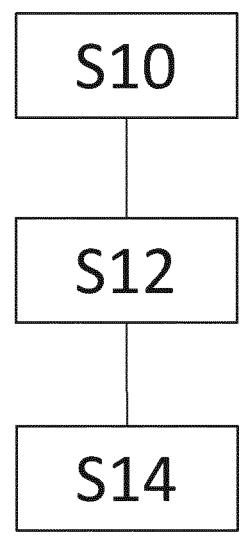
FIG. 5 is a schematic diagram of the steps of a method for manufacturing an optical lens according to the invention.

As illustrated on FIG. 5, the invention also relates to a method for manufacturing a progressive ophthalmic lens adapted to a wearer, comprising:
- an optical lens providing step S10, during which an optical lens is provided,
- an optical function determining step S12, during which an optical function is determined according to the method of the invention, and
- a progressive ophthalmic lens manufacturing step S14, during which a progressive ophthalmic lens is manufactured from the optical lens based on the determined optical function.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining an optical function of a progressive ophthalmic lens adapted to a wearer, the progressive ophthalmic lens including a fitting cross, a far vision zone with an optical power corresponding to a far distance power, a near vision zone with an optical power corresponding to a near distance power and a progression zone with a gradient of optical power extending from the far vision zone to the near vision zone, the near vision zone extending from a first lowering gaze angle to a second lowering gaze angle with respect to the fitting cross, the method comprising:
providing a prescription of the wearer;
providing wearing data related to specific wearing conditions, the wearing data comprising at least a wearing data parameter having a numerical value;
providing, by at least one processor, a set of predefined optical functions, the predefined optical functions being predefined by setting the optical power in the near vision zone to at least one predefined value, the predefined optical functions comprising at least:
a first predefined optical function adapted to the prescription of the wearer and to a first predefined value of the at least one predefined value of a wearing data parameter, and
a second predefined optical function adapted to the prescription of the wearer and to at least a second predefined value of the at least one predefined value of the wearing data parameter, the second predefined optical function being different from the first predefined optical function; and
determining an optical function of the progressive ophthalmic lens, such that:
when the wearing data parameter has a numerical value greater than or equal to a threshold value, the optical function of the progressive ophthalmic lens is equal to the first predefined optical function, and
when the wearing data parameter has a numerical value smaller than said threshold value, the optical function of the progressive ophthalmic lens is equal to the second predefined optical function;
wherein, during the providing the first and second predefined optical functions, the optical power in the near vision zone is set to the respective predefined value when a wearing distance is greater than or equal to the threshold value, and the optical power in the near vision zone is set to an optimized value smaller than the respective predefined value when the wearing distance is below the threshold value, and
when the wearing distance is below the threshold value, then the optical power in the near vision zone is at least 0.10 D smaller than the predefined value in the near vision zone.

2. The method according to claim 1, wherein the wearing data parameter comprises the wearing distance corresponding to a distance between a part of the eye of the wearer and an optical lens under the specific wearing conditions, and
during the determining the optical function of the progressive ophthalmic lens,
when the numerical value of the wearing distance is greater than or equal to the threshold value, the optical function of the progressive ophthalmic lens is equal to the first predefined optical function, and
when the numerical value of the wearing distance is smaller than said threshold value, the optical function of the progressive ophthalmic lens is equal to the second predefined optical function.

3. The method according to claim 1, wherein:
the first predefined optical function and the second predefined optical function each correspond to values for the first lowering gaze angle, the second lowering gaze angle, the optical power in the far vision zone, and the optical power in the near vision zone, and
the second predefined optical function differs from the first predefined optical function at least in one of the values for the first lowering gaze angle, the second lowering gaze angle, the optical power in the far vision zone, and the optical power in the near vision zone.

4. The method according to claim 1, wherein when the predefined value of the optical power is positive, the optimized value is less positive than the predefined value, and when the predefined value of the optical power is negative, the optimized value is more negative than the predefined value.

5. The method according to claim 1, wherein:
the prescription of the wearer is indicative of the far distance optical power,
the far vision zone extends to a third lowering gaze angle,
during the providing the first and second predefined optical functions, the position of the progression zone is predefined based on the prescription of the wearer and wearing data related to wearing conditions, so that the progression zone extends from a predefined value of a fourth lowering gaze angle, said predefined value of the fourth lowering gaze angle being greater than the third lowering gaze angle, and
during the determining the optical function, the position of the progression zone is optimized based on the predefined optical function and the wearing distance so that the progression zone extends from the predetermined value of the fourth lowering gaze angle when the wearing distance is greater than or equal to a threshold value, and at an optimized value greater than the predetermined value of the fourth lowering gaze angle when the wearing distance is below the threshold value.

6. The method according to claim 1, wherein:
the zone of optical interest comprises an additional zone extending from the near vision zone towards a lowering gaze angle greater than the second lowering gaze angle, and
during the determining the optical function, the optical power is stabilized in the additional zone at a value substantially equal to the optical power in the near distance zone when the wearing distance is below the threshold value.

7. The method according to claim 1, wherein, during the determining the optical function, the optical function of the progressive ophthalmic lens is optimized based on the respective predefined optical function and the wearing distance.

8. The method according to claim 1, wherein the wearing distance is the distance between an eye rotation center and the ophthalmic lens under wearing conditions.

9. The method according to claim 1, further comprising:
determining wearing data of the wearer under the specific wearing conditions,
wherein the determined wearing data are provided during the providing the wearing data.

10. The method according to claim 1, wherein, during the determining the optical function, the optical function of the progressive ophthalmic lens is optimized based on a linear function of the wearing distance.

11. A method for manufacturing a progressive ophthalmic lens adapted to a wearer, the method comprising:
providing an optical lens;
determining the optical function according to the method of claim 1; and
manufacturing the progressive ophthalmic lens from the optical lens based on the optimized optical function.

12. A progressive ophthalmic lens manufactured according to the method of claim 11.

13. A non-transitory computer-readable medium on which is stored a computer program comprising one or more stored sequences of instructions that are accessible to a processor and which, when executed by the processor, causes the processor to carry out the method according to claim 1.

14. A system for the execution of the method according to claim 1, the system comprising:
a memory configured to store the optical function of the progressive ophthalmic lens, the optical function being predefined based on the prescription of the wearer and on the wearing data related to the specific wearing conditions, the wearing data comprising at least the wearing distance corresponding to a distance between a part of the eye of the wearer and an optical lens under the specific wearing conditions; and
a processor determining the optical function of the progressive ophthalmic lens in a zone of optical interest based on specific threshold value for the wearing data, the processor being linked with the memory via a data connection.

15. The method according to claim 2, wherein:
the first predefined optical function and the second predefined optical function each correspond to values for the first lowering gaze angle, the second lowering gaze angle, the optical power in the far vision zone, and the optical power in the near vision zone, and
the second predefined optical function differs from the first predefined optical function at least in one of the values for the first lowering gaze angle, the second lowering gaze angle, the optical power in the far vision zone, and the optical power in the near vision zone.

16. The method according to claim 2, wherein:
the prescription of the wearer is indicative of the far distance optical power,
the far vision zone extends to a third lowering gaze angle,
during providing the first and second predefined optical functions, the position of the progression zone is predefined based on the prescription of the wearer and wearing data related to wearing conditions, so that the progression zone extends from a predefined value of a fourth lowering gaze angle, said predefined value of the fourth lowering gaze angle being greater than the third lowering gaze angle, and
during the determining the optical function, the position of the progression zone is optimized based on the predefined optical function and the wearing distance so that the progression zone extends from the predetermined value of the fourth lowering gaze angle when the wearing distance is greater than or equal to a threshold value, and at an optimized value greater than the predetermined value of the fourth lowering gaze angle when the wearing distance is below the threshold value.

17. The method according to claim 3, wherein:
the prescription of the wearer is indicative of the far distance optical power,
the far vision zone extends to a third lowering gaze angle,
during the providing the first and second predefined optical functions, the position of the progression zone is predefined based on the prescription of the wearer and wearing data related to wearing conditions, so that the progression zone extends from a predefined value of a fourth lowering gaze angle, said predefined value of the fourth lowering gaze angle being greater than the third lowering gaze angle, and
during the determining the optical function, the position of the progression zone is optimized based on the predefined optical function and the wearing distance so that the progression zone extends from the predetermined value of the fourth lowering gaze angle when the wearing distance is greater than or equal to a threshold value, and at an optimized value greater than the predetermined value of the fourth lowering gaze angle when the wearing distance is below the threshold value.

18. The method according to claim 1, wherein, when the wearing distance is below the specific threshold value, then the optical power in the near vision zone is at least 0.25 D smaller than the predefined value in the near vision zone.

* * * * *